US007955405B2

(12) United States Patent
Smith

(10) Patent No.: US 7,955,405 B2
(45) Date of Patent: Jun. 7, 2011

(54) CYCLONIC SEPARATION APPARATUS

(75) Inventor: David Benjamin Smith, Glasgow (GB)

(73) Assignee: Hoover Limited, Pentrebach (GB)

( * ) Notice: Subject to any disclaimer, the term of this patent is extended or adjusted under 35 U.S.C. 154(b) by 0 days.

(21) Appl. No.: 11/959,987

(22) Filed: Dec. 19, 2007

(65) Prior Publication Data

US 2008/0148694 A1 Jun. 26, 2008

(30) Foreign Application Priority Data

Dec. 22, 2006 (GB) .................................. 0625572.3

(51) Int. Cl.
*B01D 45/12* (2006.01)

(52) U.S. Cl. ................. 55/345; 55/346; 55/348; 55/349

(58) Field of Classification Search .................... 55/343, 55/345, 346, 349, 428, 429, 459.1, DIG. 3; 96/415, 416; 15/353, 347
See application file for complete search history.

(56) References Cited

U.S. PATENT DOCUMENTS 2,119,478 A * 5/1938 Whiton, Jr. ..................... 96/397
2,533,991 A * 12/1950 Blomquist et al. .............. 55/349
2,799,355 A * 7/1957 Easton ............................ 55/286
2,974,748 A * 3/1961 Swanson ......................... 55/287
3,424,501 A * 1/1969 Young ........................... 406/109
3,425,192 A 2/1969 Davis
3,520,114 A * 7/1970 Pall ................................ 55/347
3,648,442 A * 3/1972 Bourne ........................... 55/294
3,915,679 A * 10/1975 Roach et al. .................... 55/347
4,025,320 A * 5/1977 Amoroso ........................ 95/269
4,718,923 A * 1/1988 Haag et al. ........................ 96/56
4,746,340 A * 5/1988 Durre et al. ...................... 55/347
5,178,648 A * 1/1993 Kalen et al. ...................... 95/269
5,681,450 A * 10/1997 Chitnis et al. ................. 208/113
6,083,292 A * 7/2000 Fumagalli ....................... 55/345
6,344,064 B1 * 2/2002 Conrad ........................... 55/337
6,432,173 B1 * 8/2002 Johnson et al. ................. 95/269
6,884,273 B2 * 4/2005 Kopec et al. ..................... 55/346
6,887,290 B2 * 5/2005 Strauser et al. ................. 55/283
7,162,770 B2 * 1/2007 Davidshofer ................... 15/353
7,470,299 B2 * 12/2008 Han et al. ........................ 55/345
2002/0043055 A1 * 4/2002 Conrad ........................... 55/337
2003/0057151 A1 * 3/2003 Kopec et al. ............... 210/512.2
2005/0132529 A1 * 6/2005 Davidshofer ................... 15/347
2005/0177974 A1 * 8/2005 Conrad et al. .................. 15/353
2005/0230327 A1 * 10/2005 Bolman ........................ 210/778
2006/0059871 A1 3/2006 Han et al.
2006/0123590 A1 * 6/2006 Fester et al. .................... 15/353
2006/0168923 A1 * 8/2006 Lee et al. ........................ 55/345
2006/0230719 A1 * 10/2006 Han et al. ........................ 55/345
(Continued)

FOREIGN PATENT DOCUMENTS

DE 1739315 2/1957
(Continued)

*Primary Examiner* — Duane Smith
*Assistant Examiner* — Sonji Turner
(74) *Attorney, Agent, or Firm* — Gordon & Jacobson, PC

(57) ABSTRACT

A cyclonic vacuum cleaner comprises a first stage 10 comprising a single cyclone separator for separating heavier dirt and dust particles and a second stage 11 comprising a plurality of cyclone separators 25 arranged in parallel in a plurality of groups, each group of cyclone separators 25 comprising a respective inlet duct 24, each inlet duct 24 being connected at its upstream end to the first stage 10 and at its downstream end to the cyclone separators 25 of its respective group.

12 Claims, 3 Drawing Sheets

U.S. PATENT DOCUMENTS

| | | | | |
|---|---|---|---|---|
| 2006/0278081 | A1 * | 12/2006 | Han et al. | 96/61 |

FOREIGN PATENT DOCUMENTS

| | | | |
|---|---|---|---|
| EP | 256491 A2 | * | 2/1988 |
| EP | 1287896 | | 3/2003 |
| EP | 1692991 | | 8/2006 |
| EP | 1707096 | | 10/2006 |
| GB | 2406067 | | 3/2005 |
| GB | 2410913 | | 8/2005 |
| KR | 10-2005-0037402 | * | 2/2006 |
| WO | WO 02/067757 | | 9/2002 |
| WO | WO2006/125946 | | 11/2006 |

* cited by examiner

CYCLONIC SEPARATION APPARATUS

BACKGROUND OF THE INVENTION

1. Field of the Invention

This invention relates to cyclonic separation apparatus.

2. Related Background Art

Cyclonic separators are well known apparatus for removing particles from a gas flow without the use of filters. Cyclone separators have found utility in the field of vacuum cleaners to separate dirt and dust from the airflow. It is well known that the separation efficiency of cyclonic separators is dependent upon the force which is applied to the particles in the airflow, in accordance with the following formula.

$f=2mv^2/d$, where f=the force applied to the particles m=the mass of the particle v=the flow velocity d=the diameter of the cyclonic airflow Thus it will be appreciated that the separation efficiency is inversely proportional to the diameter of the cyclone chamber, such that smaller diameter cyclones are more suited to separating lighter particles than larger cyclones.

Accordingly, it is well known for vacuum cleaners to incorporate a first upstream stage, comprising a relatively large diameter cyclone having a maximum diameter of approximately 200 mm, and a plurality of parallel-connected downstream cyclones having a maximum diameter of approximately 20 mm. In use, the upstream cyclone separates course dirt and dust from the airflow, whereas the downstream cyclones separate the finer dirt and dust.

Vacuum cleaners of the above-mentioned type are disclosed in EP1361815, U.S. Pat. No. 3,425,192 and GB2406067 and comprise a plurality of small cyclones mounted in an array above or adjacent the larger upstream cyclone. A main airflow duct leads from the outlet of the upstream cyclone, the duct branching into a plurality of secondary ducts feeding one or more of the respective downstream cyclones.

One disadvantage of the above-mentioned arrangement is that the main duct can cause a restriction in the air flow and the resultant drop in air flow velocity reduces the separation efficiency. Another disadvantage of the above-mentioned arrangement is that the secondary ducts are complex, small and susceptible to blockage.

SUMMARY OF THE INVENTION

In accordance with the present invention, a cyclonic separation apparatus which alleviates the above-mentioned problems comprises a plurality of cyclone separators arranged in a plurality of groups, each group comprising a respective inlet duct, each inlet duct being connected at its upstream end to a dirty air inlet and at its downstream end to the cyclone separators of its respective group.

The combined cross-sectional area of the plurality of inlet ducts is large and hence the ducts do not cause a restriction in the air flow and as such the separation efficiency is maximised. Also, since the cyclones are arranged in groups, with each inlet duct only feeding some cyclone separators of the apparatus, the need for complex and small secondary ducts is avoided and the apparatus is thus less susceptible to blockage. Furthermore, any pressure drop is minimised because the inlet ducts can positioned be in close proximity to the cyclone separators.

Preferably, the inlet duct of each group extends parallel to the rotational axis of the cyclone separators of the respective group.

Preferably, the cyclone separators in each group are arranged around the longitudinal axis of the respective inlet duct of the group.

Preferably, the radial distance between the longitudinal axis of each inlet duct and each cyclone separator of their respective group is substantially equal, thereby ensuring that the airflow path to each cyclone separator is substantially the same. This helps to ensure that the volume of air flowing along each inlet duct is substantially equal, so that the dirt loadings on each cyclone are the same.

Preferably, the inlet duct of each group extends alongside the cyclone separators of the group.

Preferably, the inlet ducts are disposed at selected circumferentially- spaced points on a circular line.

Preferably, the apparatus comprises a body, e.g. formed as a one-piece molding of plastics material, the cyclonic separators being disposed side-by-side in an array in said body, the inlets extending through the body between opposite sides thereof Preferably, the inlets are open on opposite sides of the body for ease of molding, a cover being provided for fitting to one side of the body to close the downstream end of the inlets.

Preferably, the inlets are connected at their downstream ends to respective radially-extending passages leading to the respective cyclone separators of the group.

Preferably, the passages are formed in the body.

Preferably, the cyclone separators of each group are disposed at selected positions along an arcuate line centred about the longitudinal axis of the inlet duct of the group. An advantage of this arrangement is that it maximises the density of the cyclonic separators and thereby enables a larger cyclonic separators to be used than permitted by prior arrangements.

Preferably, the arcuate lines of adjacent groups are interleaved to maximise the density of the cyclone separators of the apparatus.

Preferably, the upstream ends of the inlets are connected to the outlet of an upstream cyclone separator.

Preferably, the groups of cyclone separators are grouped in a group around the longitudinal axis of the upstream cyclone separator.

Preferably, the upstream cyclone separator comprises an annular or circular outlet chamber, the ducts of each group extending from said chamber.

BRIEF DESCRIPTION OF THE DRAWINGS

An embodiment of the present invention will now be described by way of an example only, and with reference to the accompanying drawings in which.

DETAILED DESCRIPTION OF THE PREFERRED EMBODIMENT

Figure 1:
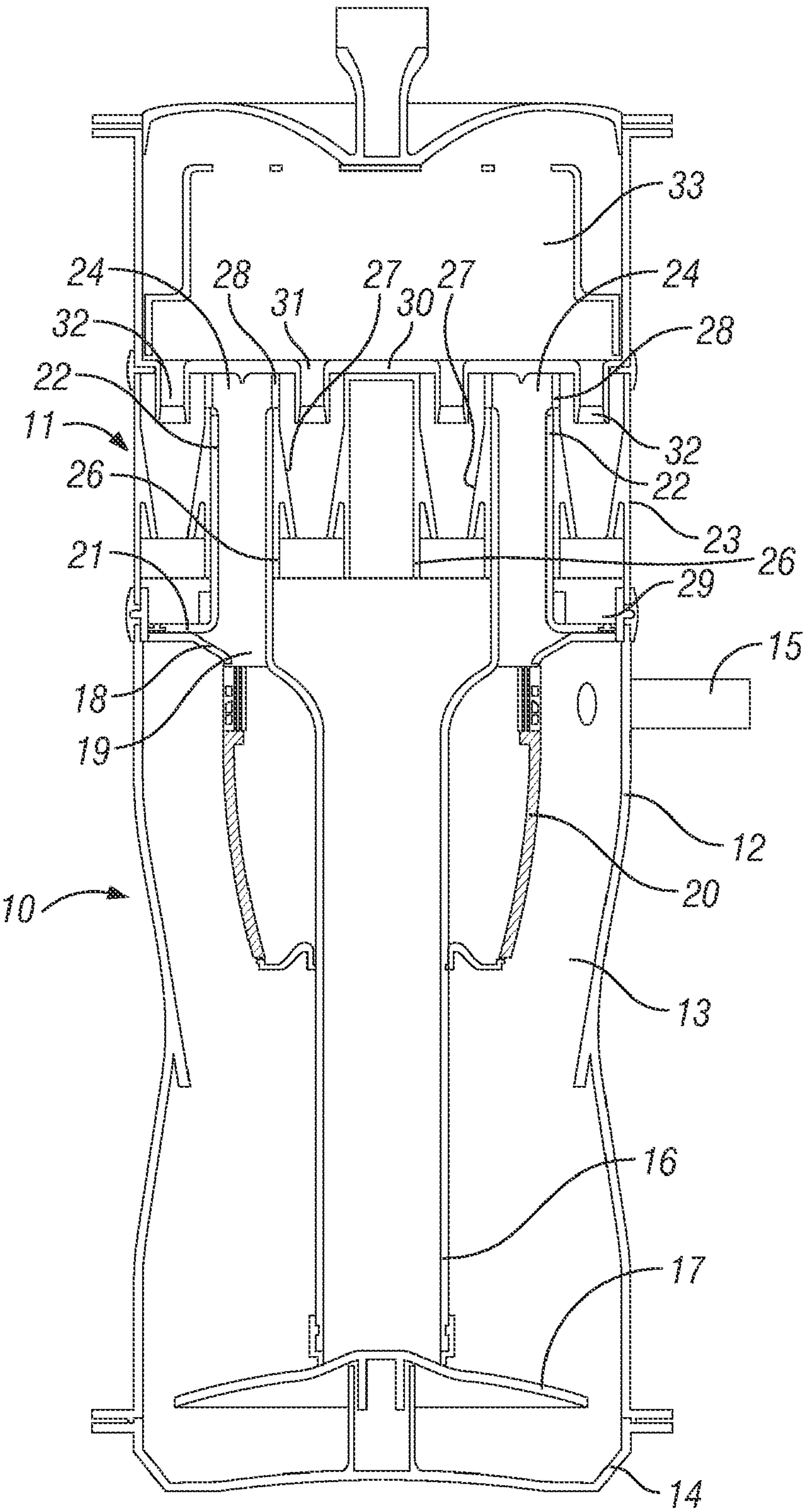
FIG. 1 is a longitudinal-sectional view through the separation portion of a 2-stage cyclonic vacuum cleaner in accordance with the present invention.

Referring to FIG. 1 of the drawings, there is shown the separation portion of an upright vacuum cleaner. The separation portion is mounted to a chassis (not shown) incorporating a handle, the lower end of the chassis being pivotally interconnected to a wheeled floor-cleaning head incorporating a rotatable agitator brush.

The separation portion comprises a generally cylindrical upright housing, which houses the first and second separation stages 10, 11 at its lower and upper ends respectively, the second stage 11 being fluidly connected downstream of the first stage 10.

The first stage 10 comprises a tubular side wall 12 defining a circular-section cyclone chamber 13. The lower end of the tubular side wall 12 is provided with a closure 14, which can be opened to allow separated dirt and dust to be emptied from the chamber 13.

An inlet duct 15 for carrying dirt and dust laden air from the floor cleaning head extends tangentially into the upper end of the tubular side wall 12 of the first stage 10. An elongate tubular container 16 extends through the cyclone chamber 13 along the centre axis thereof. The lower end of the container 16 is sealingly closed by a disk 17, which is mounted to the closure 14 such that the lower end of the container 16 is also opened when the closure 14 is opened. The upper end of the container 16 communicates with the an outlet of the second stage 11 from which the separated fine dust which is discharged.

The upper end of the first stage 10 is closed by an annular upper end wall 18 having a central aperture 19, through which the elongate container 16 extends. A perforated shroud 20 extends from the upper end wall into the cyclone chamber 13, the lower end of the shroud being sealed against the external surface of the tubular container 16.

Figure 2:
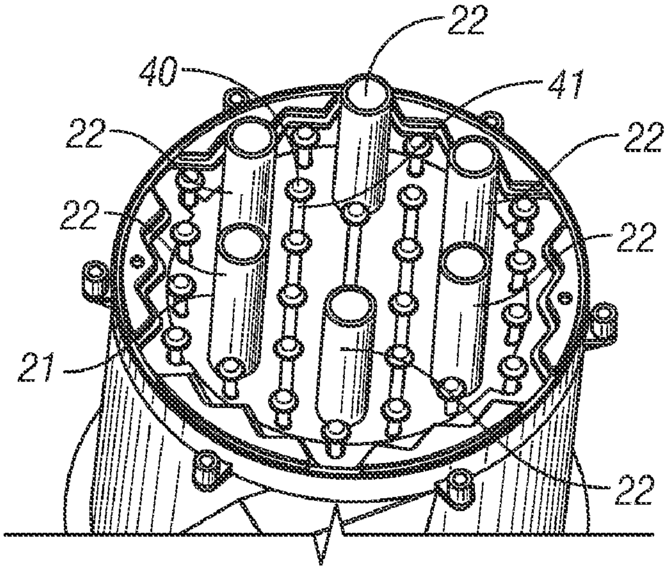
FIG. 2 is a perspective view of the top of the first stage of the cyclonic vacuum cleaner of FIG. 1, when the second stage is removed therefrom.

Referring also to FIG. 2 of the drawings, a circular manifold 21 is sealingly mounted on top of the upper end wall 18 of the first stage 10. The manifold 21 comprises six upstanding tubular projections 22, which are disposed at equally spaced circumferential positions on a concentric circular line on the manifold 21. The lower end of the projections 22 fluidly communicate with the space inside the shroud 20 through the aperture 19 in the upper end wall 18 of the first stage 10.

Figure 3:
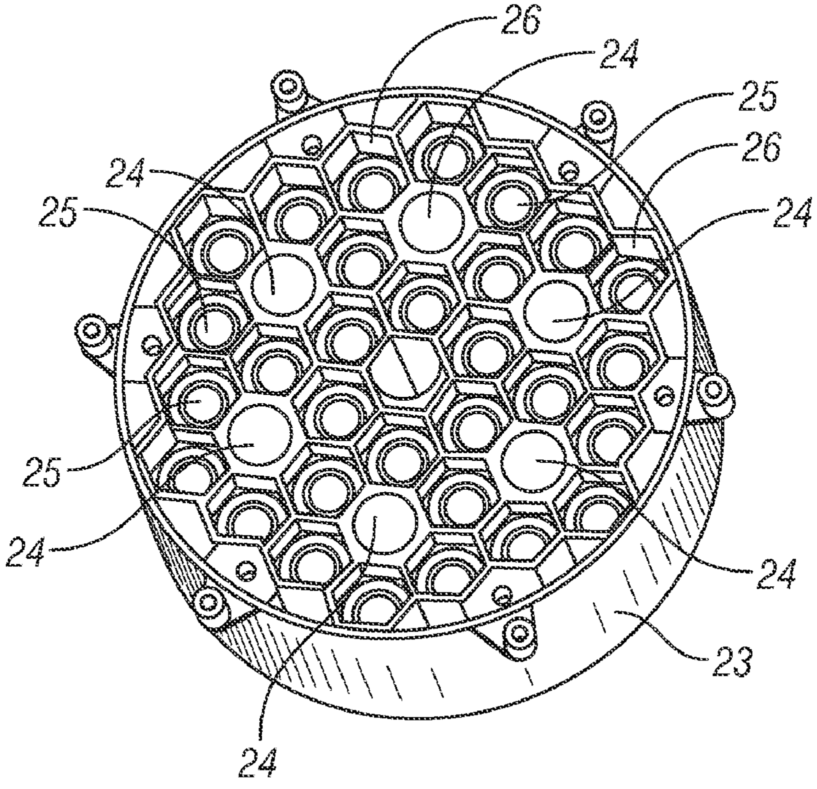
FIG. 3 is a perspective view of the bottom of the second stage of the cyclonic vacuum cleaner of FIG. 1.

Referring to FIG. 3 of the drawings, the second stage 11 comprises a cylindrical main body 23, which is fitted to the upper end of the first stage 10, the manifold projections 22 extending into corresponding apertures 24 which extend through the body 23 between opposite sides thereof. Each aperture 24 is surrounded by six cyclone separators 25 which extend axially therewith and which are equally spaced around the circumference of the apertures 24. The cyclone separators 25 are contained within hexagonal tubular boundary walls 26. Each cyclone separator 25 comprises a frusto-conical side wall 27 (as shown in FIG. 1 of the drawings), which tapers inwardly to a cone opening at the lower end of the body 23.

Figure 4:
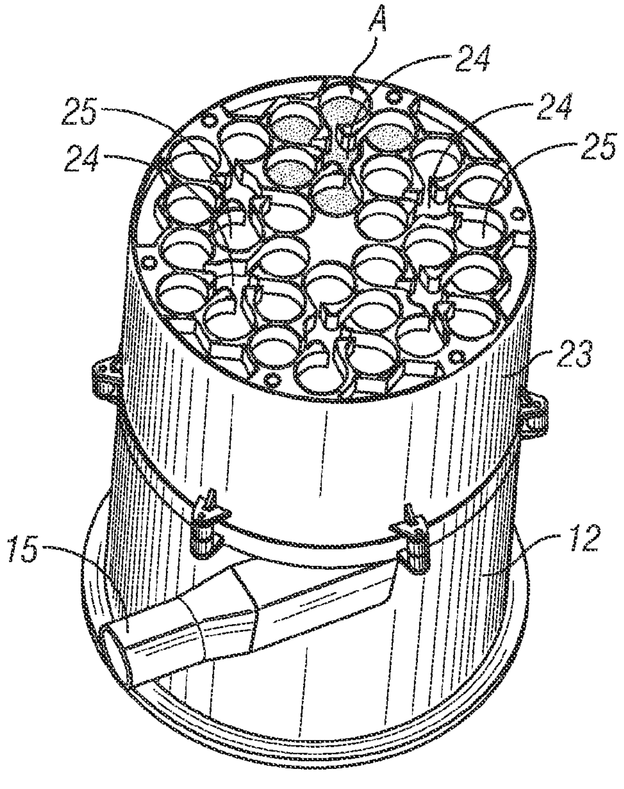
FIG. 4 is a perspective view of the top of the second stage of the cyclonic vacuum cleaner of FIG. 1, when fitted to the first stage.

Referring to FIG. 4 of the drawings, the cyclone separators 25 are arranged in six groups, each group e.g A (as denoted by the shaded area in FIG. 4) comprises five cyclone separators 25 arranged about a respective aperture 24 and disposed in an arc, which is centred on the central axis of the respective aperture 24. It will be appreciated that one of the six cyclone separators 25 surrounding each aperture 24 belongs to an adjacent group of separators.

Five channels 28 extend radially outwardly from the upper end of each aperture 24 in the upper surface of body 23. The channels 28 lead tangentially into the upper ends of respective cyclone separators 25 of the group of separators associated with that aperture.

The lower ends of the frusto-conical walls 27 of the cyclone separators 25 terminate above the level of their respective hexagonal tubular boundary walls 26, in order to prevent any cyclonic air flow from being carried over to below the bottom surface of the body 23. As shown in FIG. 2, baffles 40 supported by stems 41 extending from the upper surface of the manifold 21 may be positioned inside each hexagonal tubular boundary wall 26, just below the opening of each cone. The bottom end of the hexagonal boundary walls 26 open into a gallery 29 formed below the body 23 and above the manifold 21. The floor of the gallery 29 comprises an opening at its centre which is connected to the upper end of the elongate tubular container 16 that extends through the cyclone chamber 13 of the first stage 10.

Figure 5:
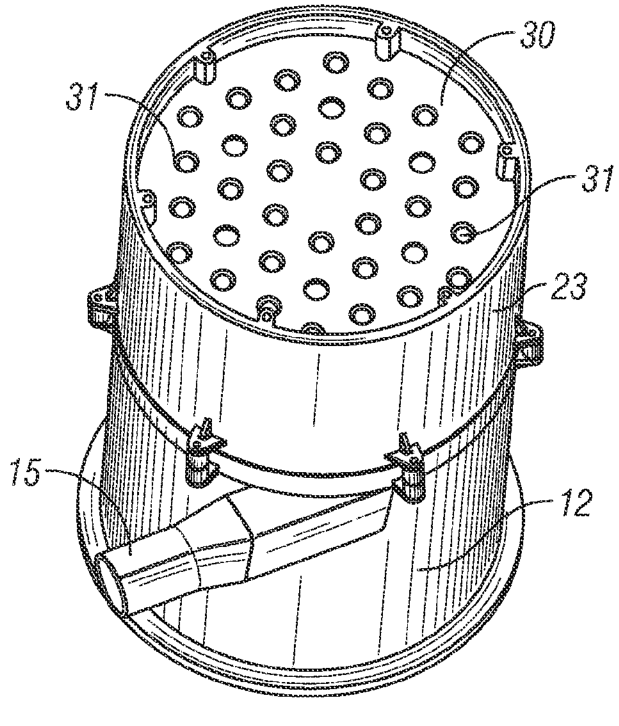
FIG. 5 is a perspective view of the top of the second stage of the cyclonic vacuum cleaner of FIG. 1, when fitted to the first stage and when a cover portion is fitted thereto.

Referring to FIG. 5 of the drawings, an apertured cover plate 30 is fitted to the upper surface of the body 23. The apertures 31 in the plates 30 are disposed axially above respective cyclone separators 25, the lower surface of the cover plate 30 comprising tubular projections 32 which extend from the apertures 31 into the upper ends of the cyclone separators to form so-called vortex finders.

A filter housing 33 is disposed above the second stage 11 and, in use, a vacuum is applied to the filter housing 33 to cause an airflow through the first and second stages 10, 11 from the dirty air inlet 15. The tangential orientation of the inlet 15 with respect to the wall 12 creates a cyclonic air flow inside the chamber 13 of the first stage 10, whereby air spirals downwardly around the chamber 13 towards its lower end. As the air flows downwards, the volume of air in the spiral flow is constantly being diminished by virtue of it having been drawn radially through the perforated shroud 20 towards the second stage 11.

As the air swirls inside the chamber 13, larger (denser) particles in the rotating airflow have too much inertia to follow the tight curve of the airflow and strike the outside wall 12 of the chamber, moving then to the bottom of the cyclone where they are deposited in the lower region of the chamber 13.

The air flowing through the perforated shroud 20 is divided equally into six separate parallel paths along the respective tubular projections 22 of the manifold 21. The six separate air flows then divide below the lower surface of the cover plate 30 into five further air flows along the respective channels 28. The channels 28 direct the airflows tangentially into the upper end of respective cyclone separators 25 to create a cyclonic airflow therein. The airflows spiral downwardly around the frusto-conical walls 27 of the separators 25 towards their lower ends. As the air flows downwards, the volume of air in the spiral flow is constantly being diminished, by virtue it having been drawn radially inwardly and axially upwardly through the vortex finders 32.

Any light particles of dust remaining in the airflow from the first stage 10 have too much inertia to follow the very tight curve of the airflow and strike the frusto-conical walls 27 of the separators 25, the dust being carried downwardly through the cone openings and into the gallery 29. The fine dust then falls into the elongate tubular container 16. It will be appreciated that the dust separated by both the first and second stages 10, 11 can be emptied by removing the closure 14.

A vacuum cleaner in accordance with the present invention is relatively simple in construction, yet has a substantially improved separation efficiency by enabling large numbers of high-efficiency cyclones to be compactly accommodated.

While the preferred embodiment of the invention has been shown and described, it will be understood by those skilled in the art that changes of modifications may be made thereto without departing from the true spirit and scope of the invention.

I claim:

1. Cyclonic separation apparatus, comprising:

an upstream cyclone separator having a longitudinal axis and an outlet;

a body disposed axially of said upstream cyclone;

a plurality of downstream cyclone separators arranged side-by-side relative to one another in said body in a plurality of groups having respective inlets, each group including at least two cyclone separators; and a plurality of inlet ducts extending through the body, each inlet duct corresponding to a respective one of the groups of downstream cyclone separators and extending fluidly in parallel from said outlet of said upstream cyclone separator to the inlet of the corresponding group of downstream cycle separators, said downstream cyclone separators in each group being arranged in the body around the corresponding inlet duct.

2. Cyclonic separation apparatus as claimed in claim 1, in which the inlet duct corresponding to a given group of downstream cyclone separators extends parallel to the rotational axis of each downstream cyclone separator of the given group.

3. Cyclonic separation apparatus as claimed in claim 1, in which the radial distance between the longitudinal axis of the inlet duct corresponding to a given group of downstream cyclone separators and each downstream cyclone separator of the given group is substantially equal.

4. Cyclonic separation apparatus as claimed in claim 1, in which the inlet duct corresponding to a given group of downstream cyclone separators extends alongside the downstream cyclone separators of the given group.

5. Cyclonic separation apparatus as claimed in claim 1, in which the inlet ducts are disposed at selected circumferentially-spaced points on a circular line.

6. Cyclonic separation apparatus as claimed in claim 1, in which the inlets are open on opposite sides of the body, and the apparatus includes a cover adapted to fit to one side of the body to close the downstream end of the inlets.

7. Cyclonic separation apparatus as claimed in claim 6, in which the inlets are connected at their downstream ends to respective radially-extending passages leading to the downstream cyclone separators of a respective group.

8. Cyclonic separation apparatus as claimed in claim 7, in which the radially-extending passages are formed in the body.

9. Cyclonic separation apparatus as claimed in claim 1, in which the downstream cyclone separators of each group are disposed at selected positions along an arcuate line centered about the longitudinal axis of the inlet duct of the group.

10. Cyclonic separation apparatus as claimed in claim 9, in which the arcuate line of adjacent groups are interleaved.

11. Cyclonic separation apparatus as claimed in claim 1, in which the groups of downstream cyclone separators are grouped around the longitudinal axis of the upstream cyclone separator.

12. Cyclonic separation apparatus as claimed in claim 1, in which the upstream cyclone separator comprises an annular or circular outlet chamber, the ducts of each group extending from said outlet chamber.

* * * * *